United States Patent [19]
Stengelin, deceased et al.

[11] 3,847,811
[45] Nov. 12, 1974

[54] APPARATUS FOR BIOLOGICALLY PURIFYING EFFLUENT

[76] Inventors: Adolf Friedrich Johann Conrad Stengelin, deceased, late of P.O. Box 519, Obere Vorstadt, 21, Tuttlingen, Germany; Volker Stengelin; Jörg Stengelin, heirs, both of P.O. Box 519, Obere Vorstadt, 21, Tuttlingen, Germany

[22] Filed: Dec. 13, 1972

[21] Appl. No.: 314,531

Related U.S. Application Data

[63] Continuation-in-part of Ser. No. 884,614, Dec. 12, 1969, abandoned.

[30] Foreign Application Priority Data
Dec. 17, 1968   Germany............................ 1815001

[52] U.S. Cl................................... 210/150, 261/92
[51] Int. Cl.......................... C02c 1/02, B01d 21/00
[58] Field of Search ............... 210/150, 151; 261/92

[56] References Cited
UNITED STATES PATENTS

| | | | |
|---|---|---|---|
| 1,811,181 | 6/1931 | Maltby | 210/150 |
| 3,389,798 | 6/1968 | Hartmann et al. | 210/151 X |
| 3,347,381 | 10/1967 | Minch et al. | 210/150 |

Primary Examiner—John Adee
Attorney, Agent, or Firm—Craig & Antonelli

[57] ABSTRACT

Apparatus for biologically purifying effluent by means of aerobic microorganisms, having at least one trickling filter mounted on a shaft, the individual sections of the filter being immersed successively in the effluent during rotation of the shaft and reemerging therefrom, the filter comprising a plurality of annular, segment-shaped or cube-shaped filter sections arranged side-by-side around the shaft and having passages presenting a large area into which the effluent penetrates on immersion and from which the effluent drains away again when reemerging.

10 Claims, 4 Drawing Figures

PATENTED NOV 12 1974  3,847,811

APPARATUS FOR BIOLOGICALLY PURIFYING EFFLUENT

This is a continuation-in-part of my copending application Ser. No. 884,614 filed Dec. 12, 1969 now abandoned.

The present invention relates to apparatus for biologically purifying effluent with the aid of aerobic microorganisms. The apparatus has at least one partially submersed trickling filter, the individual sections of which successively submerge in the effluent and reemerge therefrom on rotation of the filter about its shaft.

The object of such trickling filter plants is to promote the growth of a biological coating on parts having large areas which immerse in the effluent and reemerge therefrom. These large areas in known plants are formed from relatively thin discs of large diameter, large numbers of which are mounted side-by-side on a rotatable shaft. There are also thick disc-shaped hollow bodies which are filled with brushwood or like substances. The latter readily become clogged and therefore have to be cleaned. Their cleaning, however, is cumbersome and time wasting. Moreover the wood rots very quickly. The discs of the first-mentioned trickling filters require large machines for their production; moreover they have to be shipped and assembled with great care. It is an object of the present invention to provide a submersible trickling filter having a large area but which requires little space, is easy to manufacture and is readily shipped, manipulated and mounted. Such a trickling filter requires little maintenance, and is highly efficient.

According to the invention an immersible trickling filter comprises a plurality of annular sector- or cube-shaped filter sections arranged side-by-side around a shaft and having passages of large area into which water enters on immersion of the section and from which it can run off again on reemerging. There is a rotary frame on which the filter sections are mounted, preferably comprising supporting rods and carried by a rotating shaft. The filter sections may be formed of individual plates placed on one another each having a surface provided with undulatous or a plurality of pyramid-shaped raised portions. Such filter sections do not occupy much space, but have a large area to be wetted with the effluent. When forming the filter sections, care must be taken that passages are so arranged that effluent may readily run on and off all surfaces. Preferably the passages are located tangential to the circumference of the trickling filter and substantially transversely to the axis. It must be ensured that no effluent is left in hollow spaces or passages when the part of the filter concerned leaves the liquid.

These and other objects, features and advantages of the present invention will become more obvious from the following description when taken in connection with the accompanying drawings which shows, for purposes of illustration only, several embodiments in accordance with the present invention, and wherein.

Figure 1:
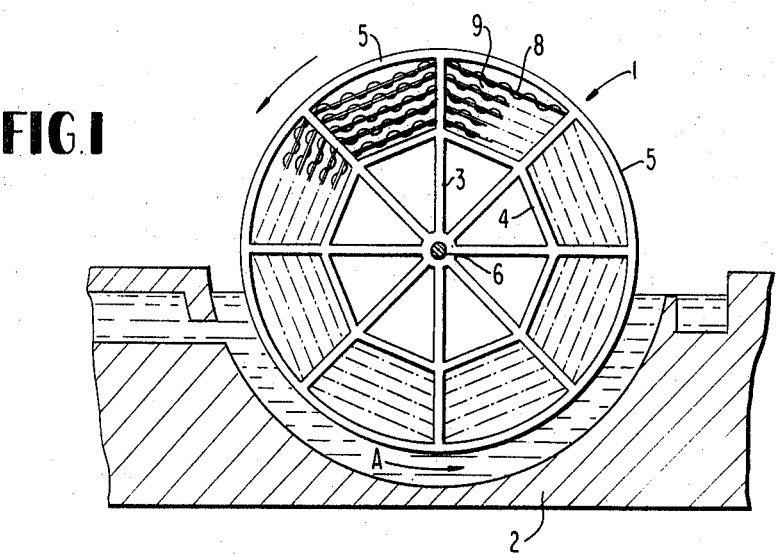
FIG. 1 is a plan view of a trickling filter having a plurality of filter sections arranged in an effluent basin in accordance with the present invention.
Figure 2:
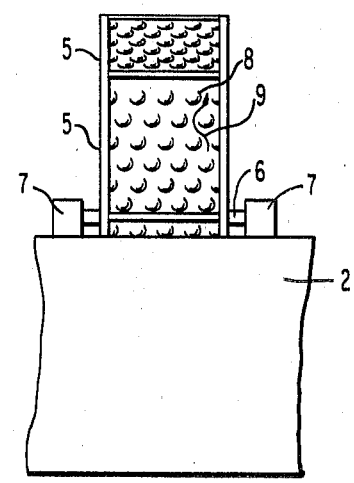
FIG. 2 is a side view of the filter of FIG. 1.

Referring now to the drawings, FIG. 1 shows a trickling filter 1 mounted in an effluent basin 2 wherein the effluent flow is from left-to-right in the plane of the figure as shown by arrow A. The trickling filter is partly immersed in the effluent and includes a frame 3 formed of supporting rods 4 and on which frame a plurality of filter sections 5 are mounted. The filter is mounted for rotation about a shaft 6 which is rotatably mounted in bearings 7 at the rim of the effluent basin as shown in FIG. 2.

The filter sections 5, as shown in FIG. 1, are sector-shaped and are placed side-by-side without clearance. The filter sections include a stacked layer arrangement of plates 8 having a corrugated or undulating surface with the plates being spaced from one another such that passages 9 are formed therebetween, which passages extend substantially perpendicularly to the surface of the effluent at the point of immersion of the passages into the effluent as well as the point of emerging of the passages from the effluent. In other words, the respective longitudinal axes of the passages are located in planes which are parallel to planes tangential to the circumference of the trickling filter and substantially transverse to planes through the axis of rotation thereof. The passages with undulating surfaces define tortuous flow paths having an increased contact area for the effluent.

Figure 3:
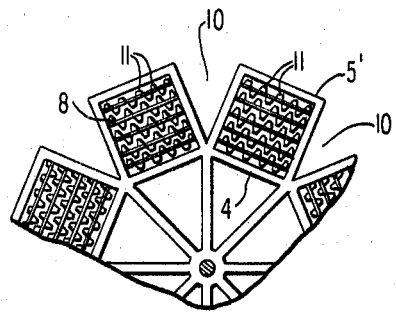
FIG. 3 is a partial plan view of the trickling filter illustrating another embodiment of filter sections therefor.

As shown in FIG. 3, in accordance with another embodiment of the present invention, filter sections 5' may be in the shape of cubes having a base edge mounted on the rotary frame 4 by any suitable connecting means. The individual filter sections have adjacent base edges in abutment and adjacent and facing edges spaced from one another so as to form a clearance space 10 which increases in the radial direction. As shown, the plates 8' of the filter section 5' have a serrated surface formed by a plurality of pyramid-shaped raised portions 11. In this arrangement, a minimum free passage of approximately 10 mm is provided whereas with the corrugated plates of FIG. 1 a spacing of between 10 – 20 mm is provided between the plates to form the desired passages. The plates 8' resemble a carrier plate for fresh eggs and if several egg carrier plates were stacked one upon another in layers, a structure similar to that of FIG. 3 would be formed.

Figure 4:
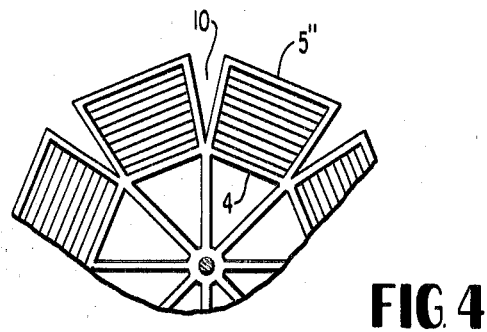
FIG. 4 illustrates a further embodiment of filter sections in accordance with the present invention.

The embodiment of FIG. 4 is similar to that of FIG. 3 with the filter sections 5'' being in the shape of a parallelepiped. In this embodiment, the filter sections are formed of a plastic material such as polystyrene wherein each section has a wasp nest-like or reticulated structure with interlacing passages, the passages extending in the same manner as the passages of the FIG. 1 and FIG. 3 embodiments so that the longitudinal axes of the passages extend substantially vertically to the surface of the effluent at the point of immersion into the effluent and point of emerging therefrom. It should be noted that the stacked plate arrangements or the plastic reticulated structure may be utilized in any of the different shaped filter sections and the filter may be formed of individual filter sections joined in the region of the rotatable shaft and extending radially therefrom.

In operation, the trickling filter is rotated about the axis of rotation of the shaft such that the filter is rotated through the effluent with the passages 9, at the moment of immersion or emerging, being disposed substantially vertically with respect to the sufrace of the effluent. In this manner, during immersion, the air present in the passages, which is consumed during the rotation of the filter above the effluent surface, is forcibly displaced by the entering effluent. During emerging, fresh air is sucked into the ducts by the discharged effluent and a forced exchange takes place. As such, the arrangement of the passages permits the effluent to tangentially penetrate and drain away without clogging thereof so as to eliminate the need for cleaning of the filter. Additionally, the arrangement of filter sections is such that a submersible trickling filter having a large area is formed which filter is easy to manufacture in sections and is readily shipped, manipulated and mounted.

Obviously, many modifications and variations of the present invention are possible in the light of the above teachings, it should therefore be understood that within the scope of the appended claim, the invention may be practiced otherwise than as specifically described.

I claim:

1. A trickling filter for biologically purifying effluent by means of aerobic microorganisms, comprising a horizontal rotatable shaft, a plurality of self-supporting filter sections annularly arranged side-by-side in fixed relation to and spaced from said shaft in a single vertical plane, multiple passage means in each section defining tortuous flow paths providing surfaces of increased area through which passage means the effluent can penetrate and drain away, and means for supporting and rotating said shaft so that said sections successively enter and leave said effluent, the longitudinal axes of the passage means extending in planes parallel to planes substantially tangential to the circumference of the filter and substantially transverse to planes through the axis of rotation of the filter.

2. A filter as recited in claim 1, comprising a rotatable frame made of carrier rods attached to said shaft, and means for mounting said sections on said frame.

3. A filter as recited in claim 1, wherein each section comprises a plurality of individual plates arranged in layers one upon the other, each plate having a surface with undulations thereon so as to increase the surface area of each flow path.

4. A filter as recited in claim 1, wherein said filter sections are so formed and arranged that they abut at adjacent base edges and so that their edges adjacent and facing one another have clearances increasing in size radially.

5. A filter as recited in claim 1, wherein said filter sections are made of a plastic material, with a reticulated structure and interlacing passages defining the tortuous flow paths.

6. A trickling filter for biologically purifying effluent by means of aerobic microorganisms comprising a horizontal rotatable shaft, a substantially annular filter body comprised of a plurality of separate three-dimensionally enclosed, hollow filter sections arranged consecutively around and spaced from said shaft, each of said sections including large area multiple passageways therein constructed to permit effluent to tangentially penetrate and drain away without the clogging thereof, frame means connecting said filter sections in fixed relation to said shaft so that said filter sections and said shaft rotate together, and means for supporting and rotating said shaft so that said sections successively enter and leave said effluent.

7. A trickling filter according to claim 6, wherein each of said sections of said filter body has a flat side facing said shaft, said sections being constructed and disposed around said shaft such that each of the flat sides of said sections forms, in a cross section perpendicular to said shaft, a side of a regular concave polygon.

8. A trickling filter according to claim 7, wherein each of said sections therein includes a plurality of stacked plates disposed on the interior face of said flat side and arranged so that effluent can readily run on and off all surfaces thereof, each plate traversing the length of the section in a cross section perpendicular to said shaft and having an undulating surface.

9. A trickling filter for biologically purifying effluent by means of aerobic microorganisms comprising a horizontal rotatable shaft, a frame connected to said shaft and having an outer supporting boundary with the shape of a regular concave polygon, a plurality of filter sections each adjoining a side of the polygon-shaped boundary of said frame in fixed relation to said shaft and comprised of a plurality of stacked, self-supporting-planarly-corrugated plates, said filter sections being constructed to permit said effluent to tangentially penetrate and drain away without the clogging thereof, and means for supporting and rotating said shaft so that said sections successively enter and leave said effluent.

10. A filter according to claim 1, wherein said passage means at the point of emerging from the effluent provide for an immediate displacement of the effluent from said passage means so as to eliminate the need for cleaning the filter.

* * * * *